United States Patent [19]

Kadota et al.

[11] Patent Number: 5,004,031

[45] Date of Patent: Apr. 2, 1991

[54] PNEUMATIC TIRE WITH A STRIP REINFORCING LAMINATE HAVING FILAMENTS ARRANGED TOGETHER IN AN UNDULATING FORM

[75] Inventors: Kuninobu Kadota; Yoshihide Kohno; Hiroyuki Koseki, all of Kodaisa, Japan

[73] Assignee: Bridgestone Corp., Tokyo, Japan

[21] Appl. No.: 320,422

[22] Filed: Mar. 7, 1989

[30] Foreign Application Priority Data

Mar. 9, 1988 [JP] Japan .................................. 63-53672
Sep. 19, 1988 [JP] Japan ................................. 63-232254

[51] Int. Cl.$^5$ ............................ B60C 9/28; B60C 9/22; B32B 25/02
[52] U.S. Cl. .................................... 152/538; 152/531; 152/532; 152/534; 428/290
[58] Field of Search ............... 152/533, 531, 538, 539, 152/540, 543, 542, 526, 534, 536, 530, 532; 156/117; 245/1.5; 428/290, 295

[56] References Cited

U.S. PATENT DOCUMENTS

| | | | |
|---|---|---|---|
| 1,189,223 | 7/1916 | Albrecht | 152/533 |
| 1,536,661 | 5/1925 | Conner | 245/1.5 |
| 1,612,922 | 1/1927 | Hopkins | 245/1.5 |
| 2,982,328 | 5/1961 | Emanueli | . |
| 3,044,522 | 7/1962 | Drakeford et al. | 152/543 X |
| 3,800,844 | 4/1974 | Boileau | . |
| 4,172,487 | 10/1979 | Suzuki et al. | 152/527 |
| 4,219,601 | 8/1980 | Inoue et al. | 152/527 X |

FOREIGN PATENT DOCUMENTS 0246620 12/1960 Australia .............................. 152/533
815055 3/1956 United Kingdom .

*Primary Examiner*—Michael W. Ball
*Assistant Examiner*—Gregory J. Wilber
*Attorney, Agent, or Firm*—Sughrue, Mion, Zinn, Macpeak & Seas

[57] ABSTRACT

A strip-like reinforcing laminate is comprised of at least two laminated strips each containing wave-like or zig-zag reinforcing elements covered with a particular polymer material, wherein each reinforcing element in each of these strips has interlaced portions crossly lying on at least two reinforcing elements included in the adjoining strip, and the reinforcing elements in all of these strips are aligned in the same direction. Further, such a strip-like reinforcing laminate is used as a reinforcement in various parts of a pneumatic tire.

27 Claims, 14 Drawing Sheets

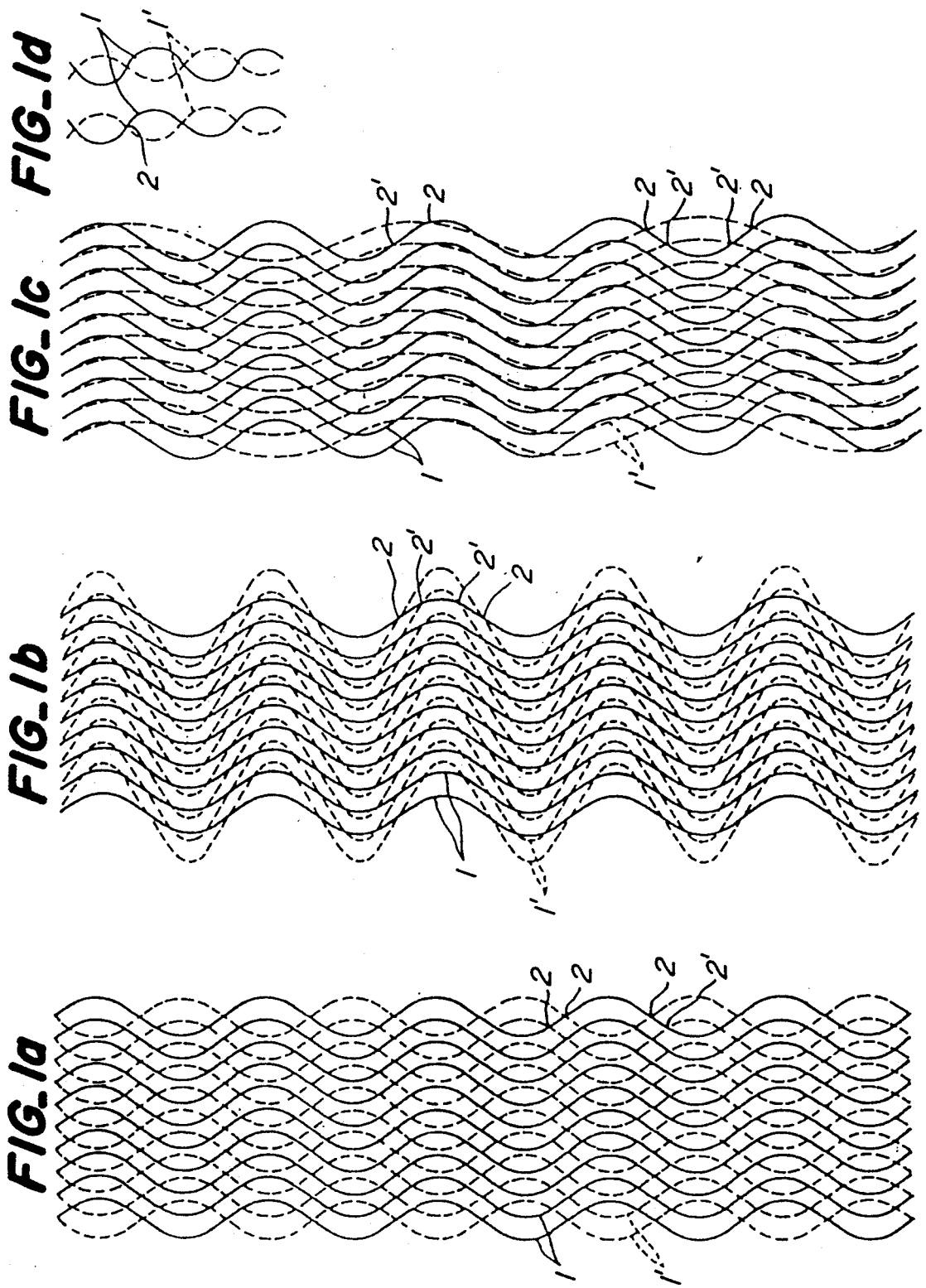

FIG_3a
FIG_3b
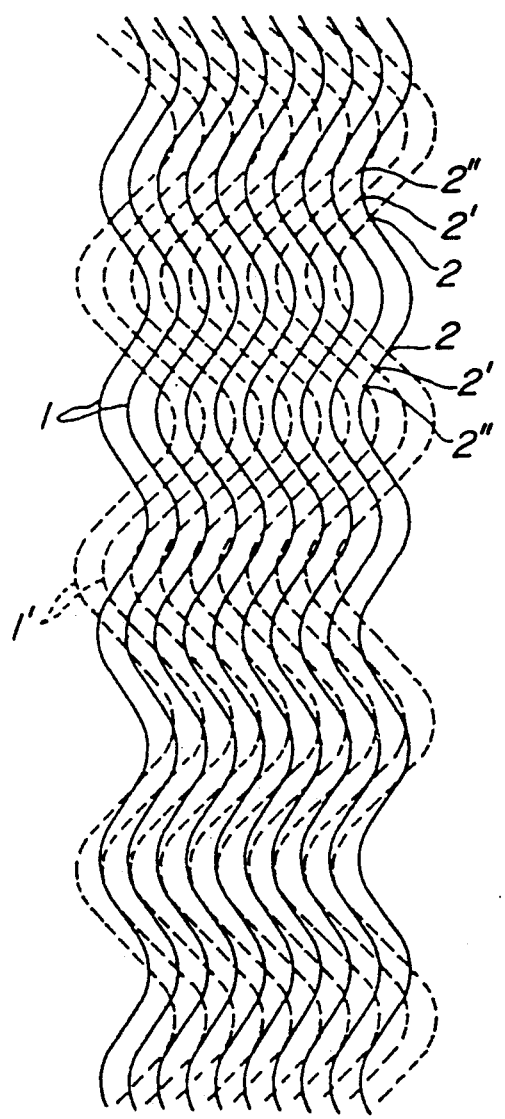
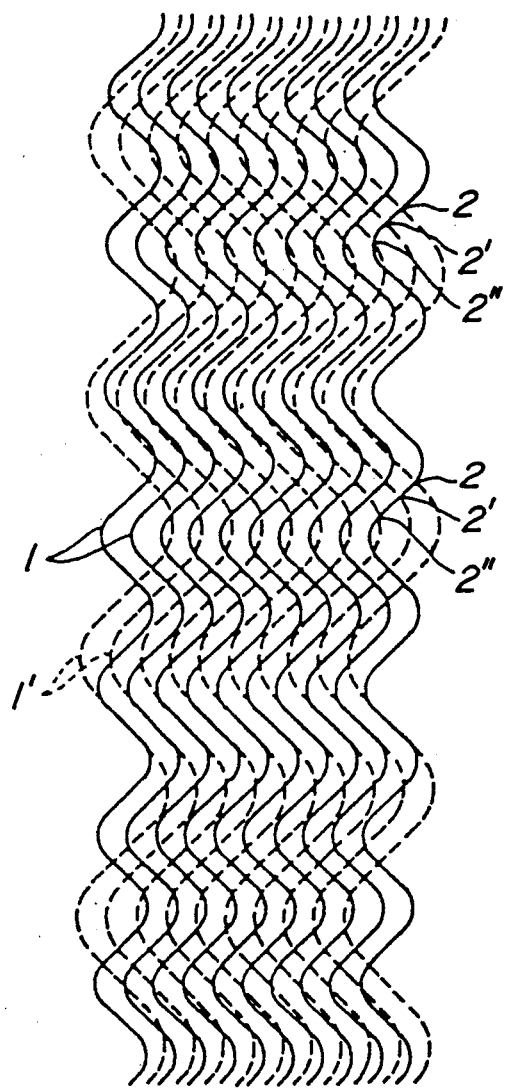

FIG_4a
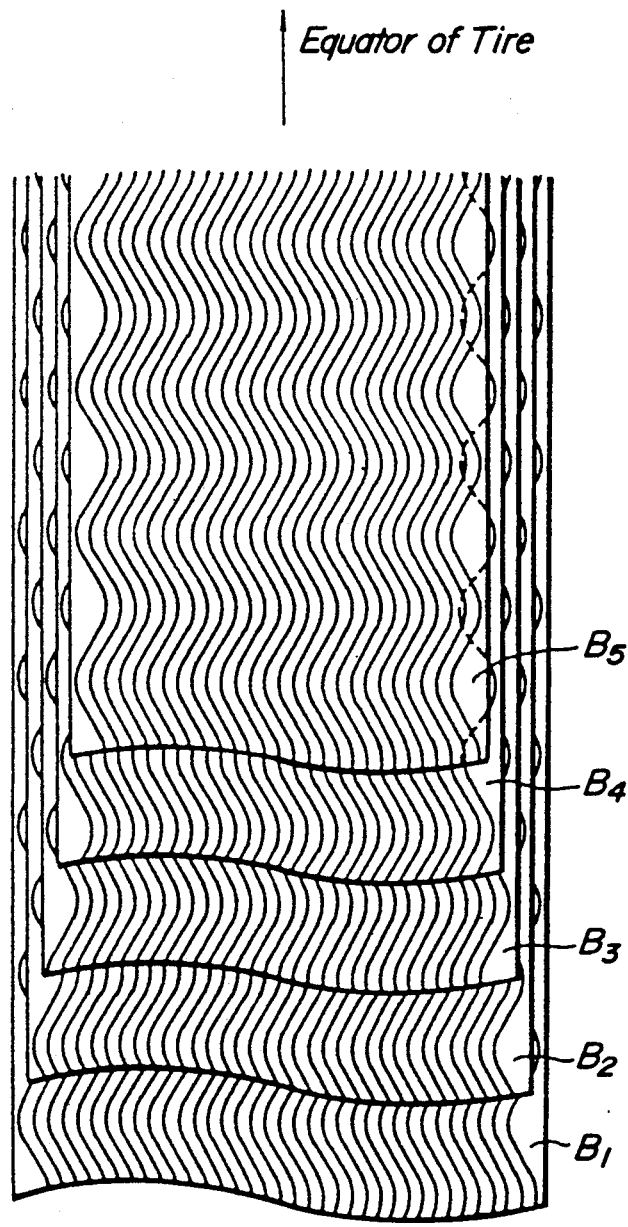

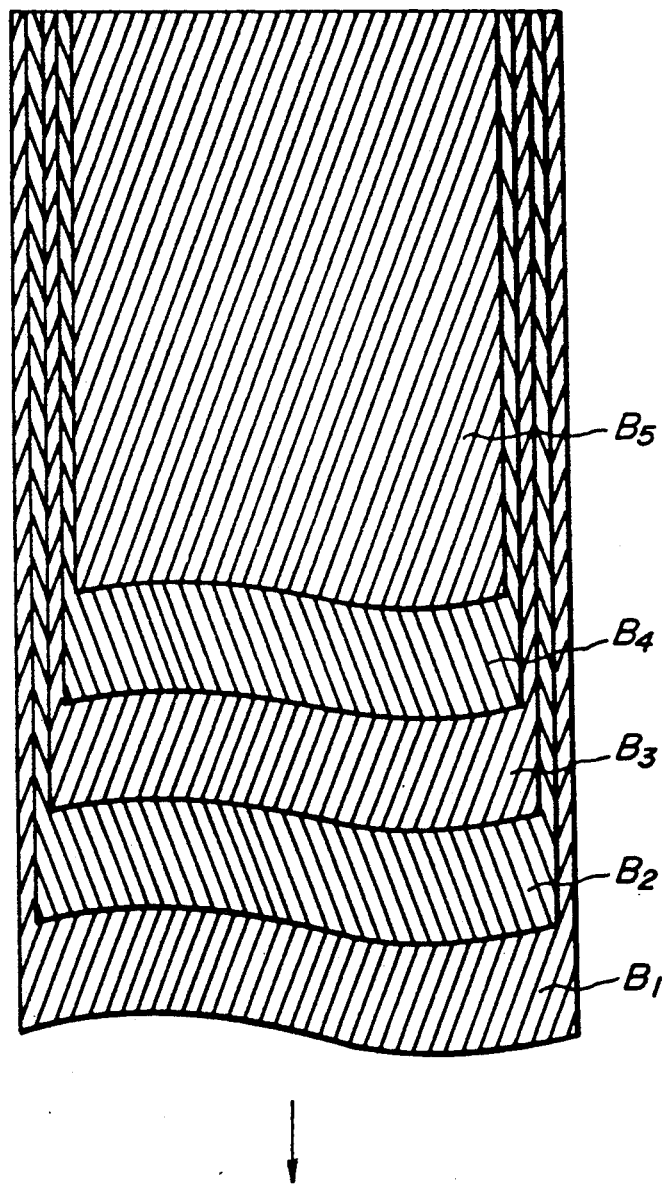
FIG_4b
PRIOR ART

FIG._6a
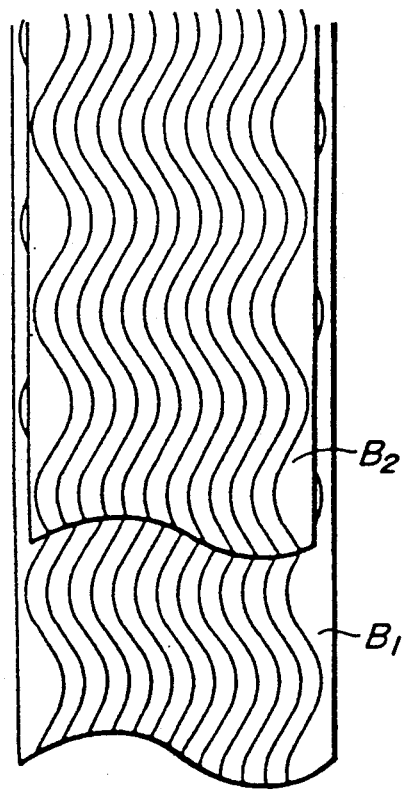
$B_2$
$B_1$
FIG._6b
PRIOR ART
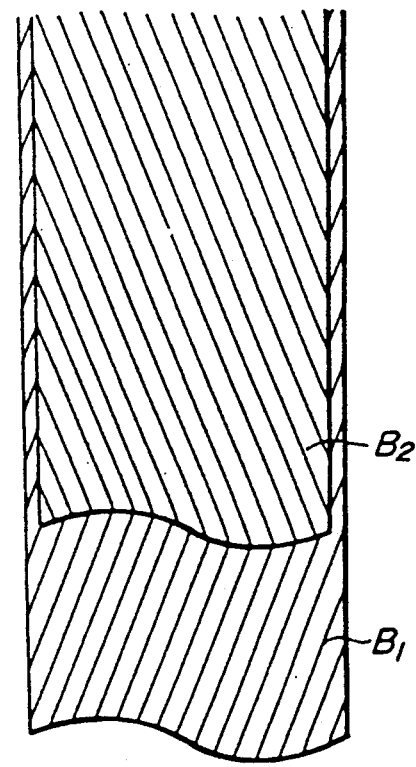
$B_2$
$B_1$

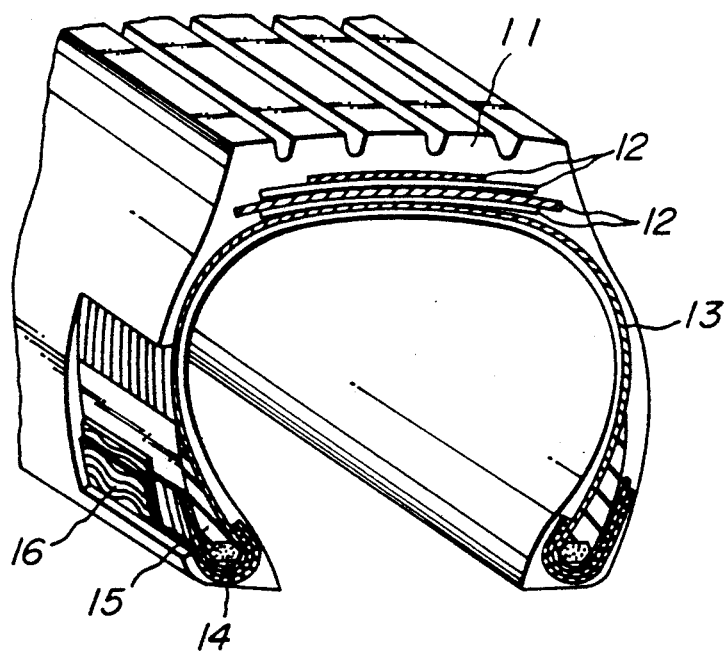
FIG_7

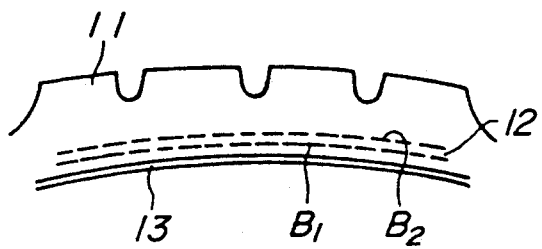
FIG_8
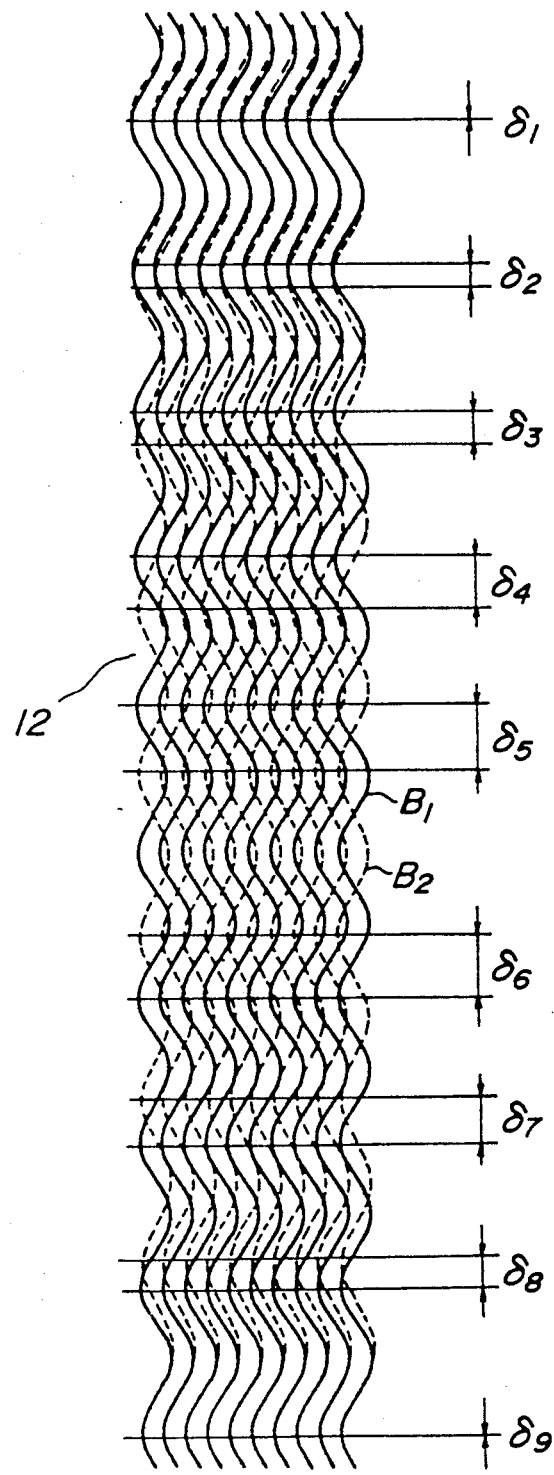
FIG_9

FIG_10
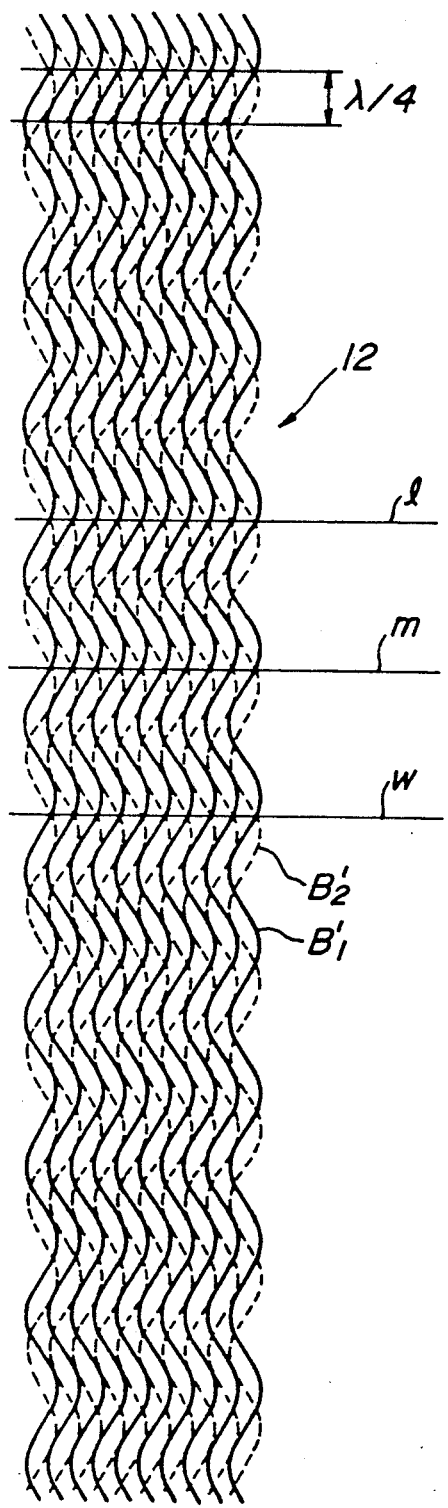
FIG_11
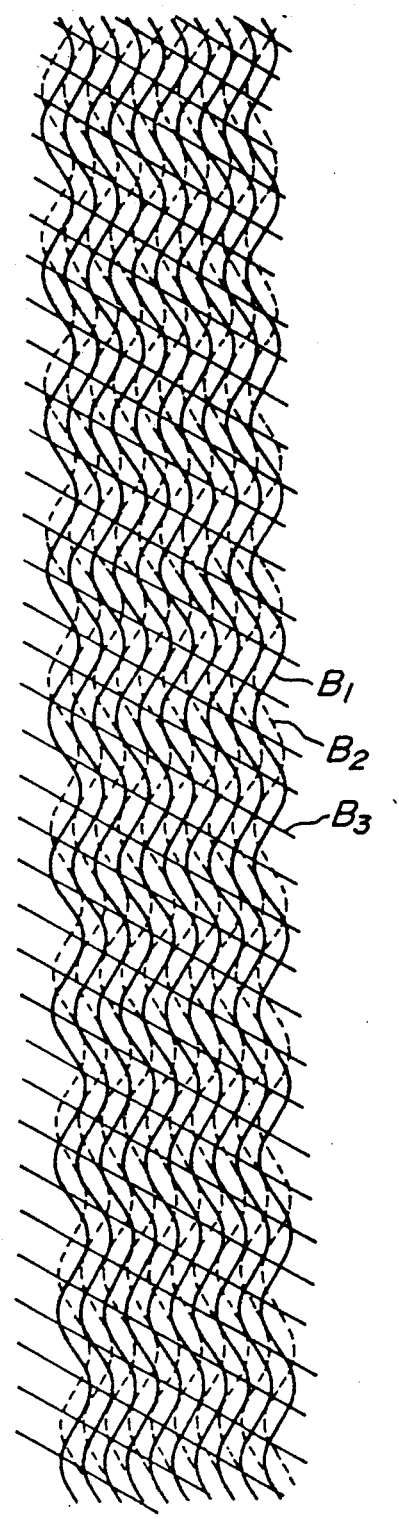

FIG_12
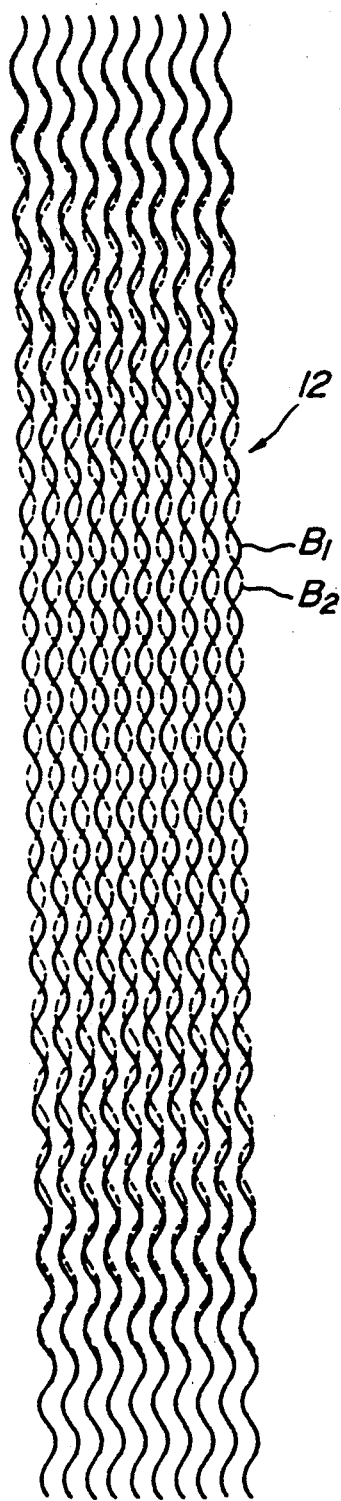
FIG_13
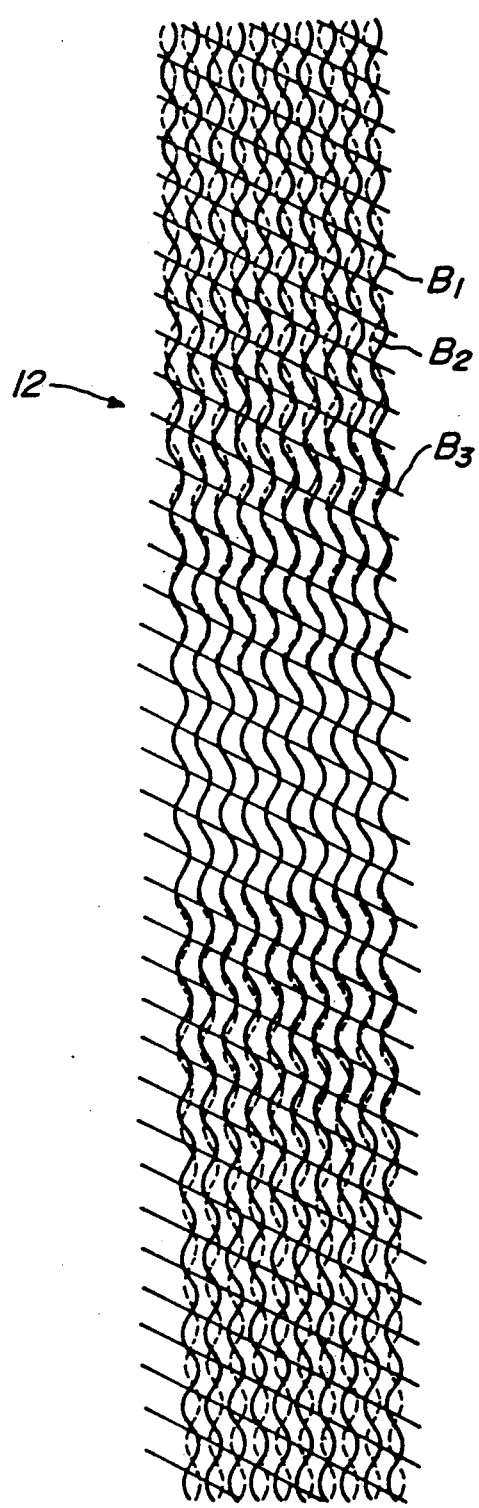

FIG_16
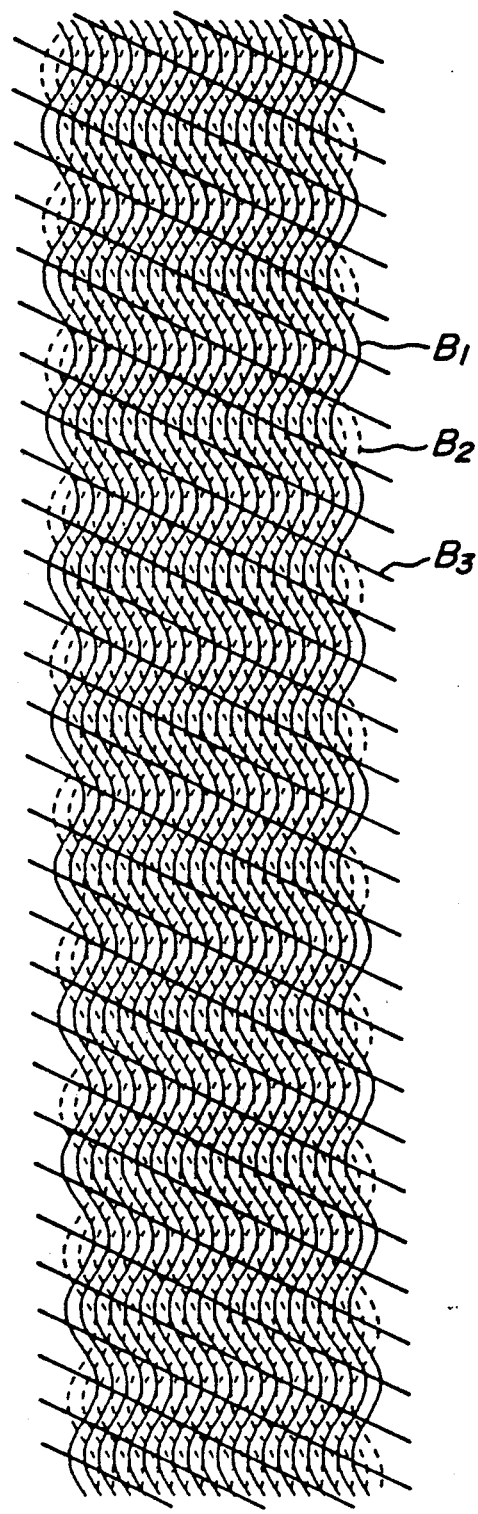

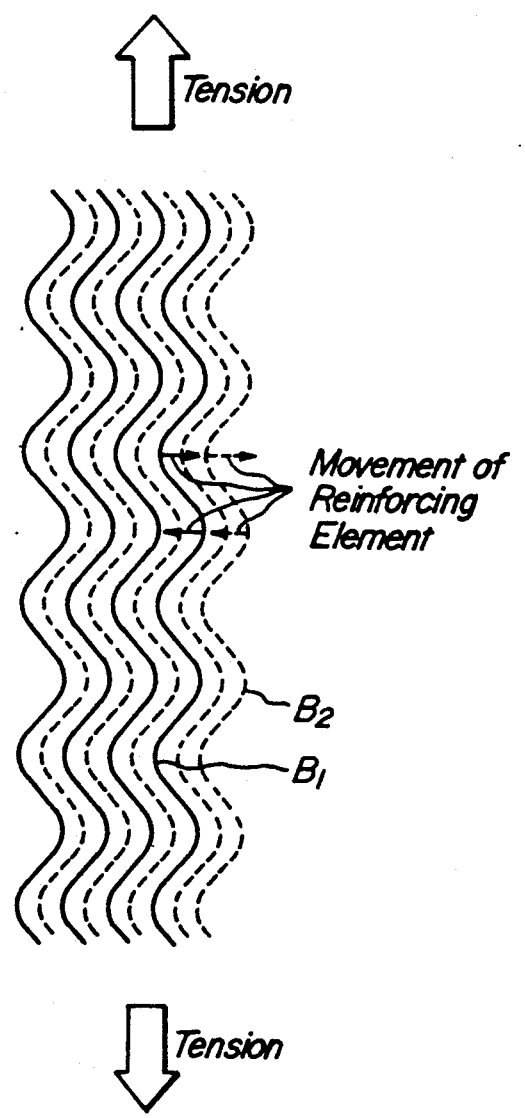
FIG._17
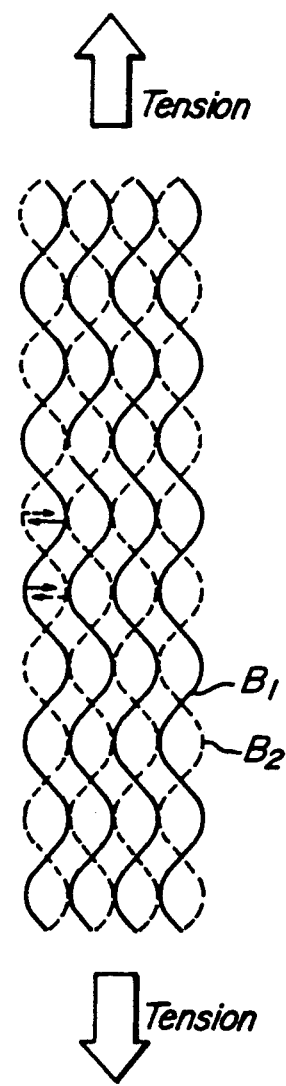
FIG._18

PNEUMATIC TIRE WITH A STRIP REINFORCING LAMINATE HAVING FILAMENTS ARRANGED TOGETHER IN AN UNDULATING FORM

BACKGROUND OF THE INVENTION

1. Field of the Invention

This invention relates to a strip-like reinforcing laminate usable as a composite material for reinforcement and a pneumatic tire using the same.

2. Related Art Statement

The composite material of this type comprises a matrix and a dispersing member or reinforcing member and includes high polymer fiber reinforced plastics (FRP), fiber reinforced thermoplastics (FRTP), fiber reinforced rubber (FRR) and the like.

In the conventional FRP, the reinforcement of plastic matrix is attempted by dispersing powder, short fibers or the like into the matrix, but it sometimes undesirably causes a difference in rigidity at end portion of the region reinforced with fibers or the like dispersing into the matrix. Also it is difficult to achieve the reinforcement of the matrix by dispersing and embedding these fibers and the like.

On the other hand, rubberized cord fabrics in which cords usually obtained by twisting organic fibers or metal filaments, particularly steel wires are arranged in parallel to each other and covered with a coating rubber are generally used as a reinforcing member for pneumatic tires widely used as a product comprised of high polymer composite material. Particularly, in pneumatic tire comprising a toroidal carcass composed of such rubberized cord fabric extending between at least a pair of bead cores, the crown portion of this carcass is, for example, reinforced with a breaker or belt comprised of plural slant members obtained by obliquely cutting the above rubberized cord fabric and piling the cut fabric pieces one upon the other to cross the cords of these pieces with each other. Since such slant members are not favorable in durability because the modulus of elasticity is different between the cord and the coating rubber and also the cord is apt to move toward the end thereof and hence the stress concentration is caused in the vicinity of both side edge portions of the belt positioning ends of the cords all together. Further, the hoop effect through the slant members is large in the vicinity of the central portion of the belt, but a large tension can not be born near to the side edge of the belt, so that the belt is necessary to have a wider width for ensuring the required peripheral tension. As a result, the moving quantity of cord ends increases as the cord length becomes long, which is unfavorable in durability.

Therefore, a so-called fold structure in which the slant member is folded at its cord end, an additional cord layer containing cords arranged in a tension-acting direction and the like are used, but they are obliged to become disadvantageous in the cost.

In addition, the fold structure solves various problems resulting from stress concentration at the cord end for the present, but there are still problems such as fatigue of the cord at the folded portion of the cord, durability based on the difference in rigidity between cord and rubber. On the other hand, the additional cord layer is low in rigidity perpendicular to the cord, so that when the force is applied to the tire in all directions, it is difficult to totally obtain the required performance.

Moreover, British Pat. No. 815,055 discloses an attempt of piling two reinforcing members each containing wave-like cords one upon the other. In this example, only one cord of a first layer and only one cord of a second layer are crossed and superimposed as a pair, so that such a pair of cords in the first and second layers differ a pair of cords adjacent thereto in the rigidity and consequently the function as the reinforcing member is approximately equal to that in the case of the above additional cord layer.

SUMMARY OF THE INVENTION

It is, therefore, an object of the invention to drastically solve the aforementioned problems of the conventional techniques and to provide a novel striplike reinforcing laminate and a pneumatic tire exclusively utilizing the same.

According to a first aspect of the invention, there is the provision of a strip-like reinforcing laminate, characterized by having a lamination structure of plural strips each containing many cords or filaments arranged together in wave or zigzag form in the same plane forming a reinforcing element and covered with a high molecular weight material having a modulus of elasticity lower than that of the above element, each reinforcing element in each of said strips having interlaced portions crossly lying on at least two reinforcing elements included in the adjoining strip, and said reinforcing elements in all of said strips being aligned in the same direction.

The above invention has such preferred embodiments that the interlaced portions are dispersedly arranged in widthwise and longitudinal directions of the laminate, that at least one of phase, amplitude and wavelength of the wave-like or zigzag reinforcing element in each of strips of the above lamination structure is different between the adjoining mutual strips, that the shifting quantity of phase between the reinforcing elements of the adjoining strips is $\frac{1}{8} \sim \frac{3}{8}\lambda$ (in which $\lambda$ is a wavelength of the reinforcing element), that the reinforcing element is made from organic fiber, steel cord or steel wire, and that the reinforcing elements are covered with a coating rubber.

According to a second aspect of the invention, there is the provision of a pneumatic tire, characterized by using as a reinforcing means a strip-like reinforcing laminate comprised of plural strips each containing many cords or filaments arranged together in wave or zigzag form in the same plane forming a reinforcing element and covered with a high molecular weight material having a modulus of elasticity lower than that of the above element, each reinforcing element in each of said strips having interlaced portions crossly lying on at least two reinforcing elements included in the adjoining strip, and said reinforcing elements in all of said strips being aligned in the same direction.

In the preferred embodiment of the tire according to the invention, a toroidal carcass is extended between at least a pair of bead cores as a casing reinforcement, and further the strip like reinforcing laminate as mentioned above is provided as a reinforcing means of a crown portion of the carcass. In another embodiment, the above strip-like reinforcing laminate is provided as a reinforcing means for the bead portion.

In the pneumatic tires, particularly self-running radial tire for industrial machines and the like and radial tires for ordinary passenger cars, when the tire is run under a loading over a long time of period or further subjected to lateral force produced by the cornering, the fatigue of the reinforcing cords in the belt is conspicuous and the breakage of the cord is frequently caused to develop burst accident. As to the prevention of such cord breakage, it has hitherto been attempted only to improve the fatigue properties of the cord itself used in the belt.

In this connection, according to the other preferred embodiment of the tire according to the invention, a belt reinforcing the crown portion of the toroidal carcass is comprised of at least two belt layers each being composed of a strip containing many cords or filaments arranged together in wave or zigzag form in the same plane as a reinforcing element and covered with a high molecular weight material having a modulus of elasticity lower than that of the above element, wherein the phase of wave or zigzag form in the reinforcing element between the two strips is shifted and the shifting quantity is continuously changed in the circumferential direction of the tire.

BRIEF DESCRIPTION OF THE DRAWINGS

The invention will be described with reference to the accompanying drawings, wherein:

FIGS. 1a to 1d are schematic views for comparing lamination structures of strip-like reinforcing laminates, respectively;

FIGS. 3a and 3b are schematic views of the other embodiments of the strip-like reinforcing laminate according to the invention, respectively;

FIGS. 4a and 4b are schematic views illustrating a comparison of belt reinforcement between pneumatic tire for an airplane according to the invention and the conventional tire, respectively;

FIGS. 6a and 6b are schematic views illustrating comparison of belt reinforcement between pneumatic tire for a passenger car according to the invention and the conventional tire, respectively;

FIG. 7 is a perspective view of a tire having another tire reinforcement;

FIG. 8 is a partially sectional view of the tire;

FIG. 9 is a schematically developed view of the belt adaptable in the invention;

FIGS. 10 and 11 are schematically developed views of the belt for comparison, respectively;

FIGS. 12 and 13 are schematically developed views of the belt used in Examples as mentioned below, respectively;

FIGS. 14 to 16 are schematically developed views of the belt used in another Examples as mentioned below, respectively;

FIG. 17 is a schematically developed view of the belt for comparison; and

FIG. 18 is a schematically developed view of the belt used in the other Example as mentioned below.

DESCRIPTION OF THE PREFERRED EMBODIMENTS

FIGS. 1a to 1c are various embodiments of the reinforcing laminate typically illustrating the arrangement of two strips each containing the reinforcing elements according to the invention, wherein the phase, amplitude or wavelength of the reinforcing element between the strips is different, respectively. Numerals 1, 1' are reinforcing elements such as cords or filaments arranged side by side in wave form in the same plane.

These reinforcing elements 1, 1' are covered with a high molecular weight material having a modulus of elasticity lower than that of the reinforcing element such as rubber (not shown) to form strips to be laminated in form of a layer. In these reinforcing laminates, each reinforcing element 1 of the strip among the above two strips has interlaced portions lying on at least two crossed reinforcing elements 1' included in the remaining adjacent strip. Furthermore, all reinforcing elements 1, 1' of these strips are arranged in the same direction.

Numerals 2, 2' show a part of the interlaced portions between the crossed reinforcing elements in the two strips.

For reference, a case that the reinforcing element 1 of one strip in the reinforcing laminate composed of two strips crossly lying on only one reinforcing element 1' of the other strip is shown together with its interlaced portions in FIG. 1d.

Figure 2C:
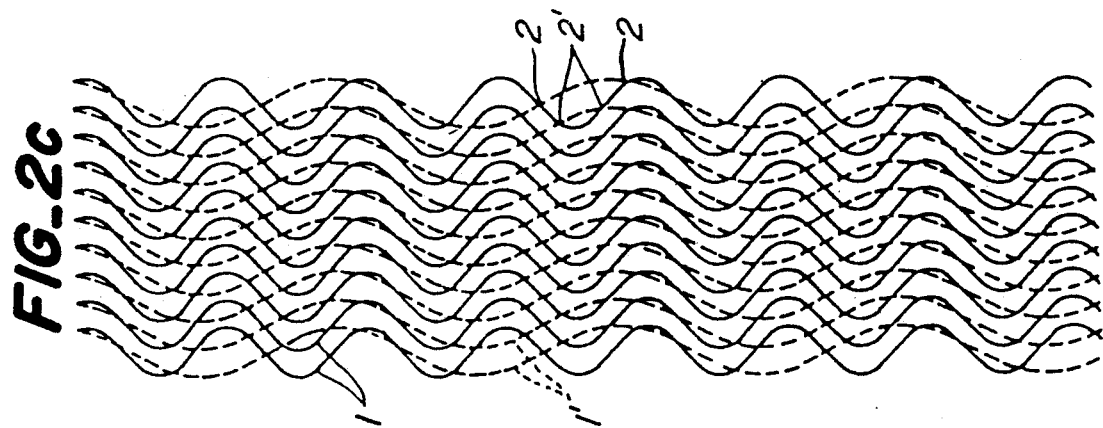
FIGS. 2a to 2c are schematic views of other embodiments of the strip-like reinforcing laminate according to the invention, respectively.
Figure 2B:
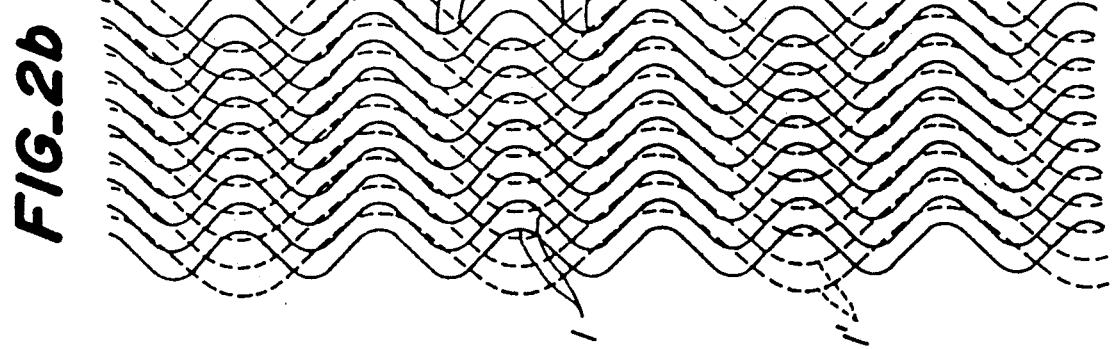
Figure 2A:
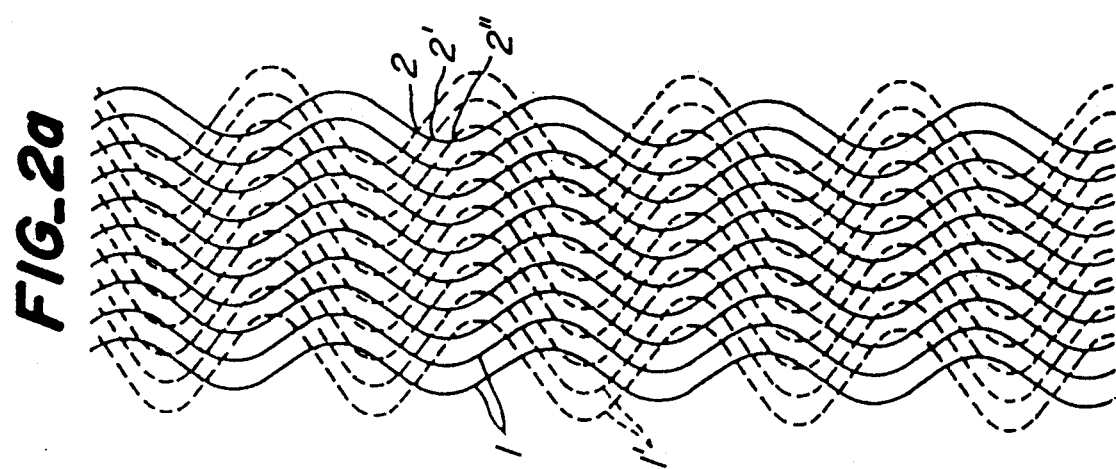

Further, FIGS. 2a to 2c are various embodiments of the reinforcing laminate typically illustrating the arrangement of two strips each containing the reinforcing elements according to the invention, wherein the phase and amplitude, amplitude and wavelength or wavelength and phase of the reinforcing element between the strips are different, respectively. Moreover, FIGS. 3a and 3b are embodiments of the reinforcing laminate typically illustrating the arrangement of two strips each containing the reinforcing elements according to the invention, wherein all phase, amplitude and wavelength of the reinforcing element between the strips are different, respectively.

Such a strip reinforcing laminate may be used as a reinforcing core of, for example, FRP as well as a tension-bearing reinforcing core of rubber articles such as fender and the like, and is particularly useful as a reinforcement for automobile tires. An example effectively utilizing the properties of the above strip-like reinforcing laminate is shown in FIGS. 4 to 6 in the order of airplane tire, truck and bus tire and passenger car tire together with the belt reinforcement through the conventional slant crossing members as a comparative example.

FIG. 4a is a concrete example of applying the strip reinforcing laminate composed of five strips according to the invention to a belt of an airplane tire having a tire size of H46×18.0R20, wherein wave-like cords (material: aramid (Kevlar) 3000 d/3, end count: 4.8 cords/cm, wavelength: 40 mm, amplitude: 3 mm) are used as a reinforcing element of each strip and the phase of the cord is shifted every a half wavelength in these five strips. FIG. 4b shows the conventional belt comprised of five slant crossing cord layers. In these figures, symbol B is a belt layer and a suffix thereto is a laminating order viewed from a carcass (not shown).

Figure 5B:
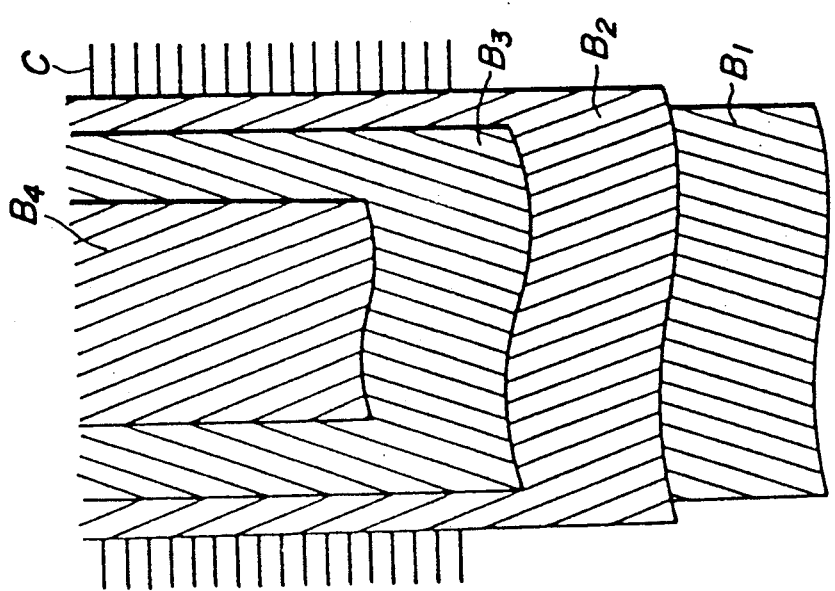
FIGS. 5a and 5b are schematic views illustrating comparison of belt reinforcement between pneumatic tire for truck and bus according to the invention and the conventional tire, respectively.
Figure 5A:
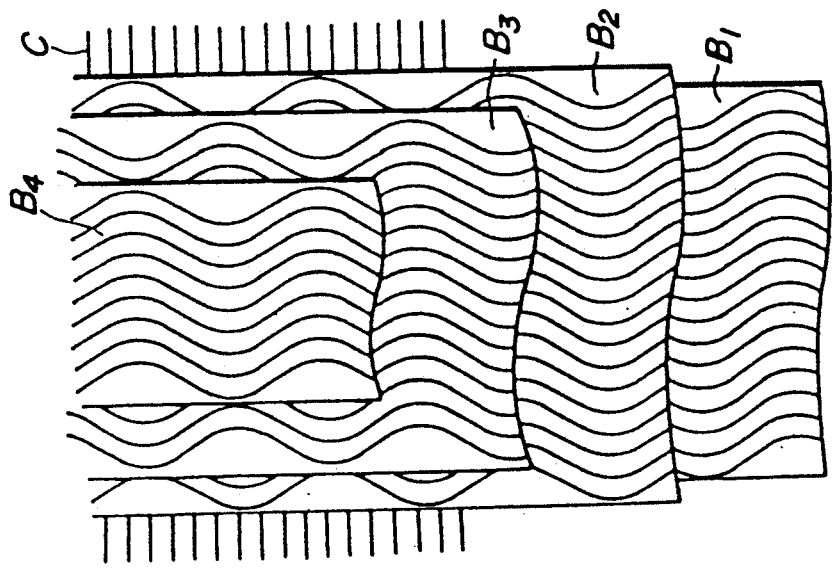

FIG. 5a is a concrete example of applying the strip-like reinforcing laminate composed of four strips according to the invention to a belt of a truck and bus tire having a tire size of 1000R20, wherein wave cords (material: aramid (Kevlar) 3000 d/3, end count: 5.6 cords/cm, wavelength: 15 mm, amplitude: 6 mm) are used as a reinforcing element of each strip and the phase of the cord is shifted every a half wavelength in these four strips. FIG. 5b shows the conventional belt comprised of four slant crossing cord layers. In these figures, symbol C is a radial carcass ply.

In FIG. 6a is a concrete example of applying the strip-like reinforcing laminate composed of two strips according to the invention to a belt of a passenger car tire having a tire size of 185/70 R13, wherein steel wires having a diameter of 0.3 mm are used as a reinforcing element of each strip. FIG. 6b shows the conventional belt comprised of two slant crossing cord layers.

In FIG. 7 is shown an embodiment of using the strip reinforcing laminate according to the invention as a chafer for the bead reinforcement of the tire. This tire has a tire size of 11R22.5 and comprises a chafer for bead reinforcement composed of the strip reinforcing laminate of two strips according to the invention, wherein wave cords (material: nylon-6,6 1260 d/2) having a wavelength of 20 mm and an amplitude of 2.5 mm are arranged at a shifting state every a half wavelength. In FIG. 7, numeral 11 is a tread, numeral 12 a belt, numeral 13 a carcass ply, numeral 14 a bead core, numeral 15 a stiffener rubber and numeral 16 a chafer.

Moreover, the term "reinforcing element" used in the invention includes a monofilament and a yarn of an organic fiber, a metallic wire such as steel wire, particularly brass or copper plated steel wire and a bundle of the metallic wires, particularly steel cord.

In FIG. 8 is schematically shown a main part of the tire according to the invention, wherein numeral 11 is a tread rubber, numeral 12 a belt and numeral 13 a toroidal carcass ply. According to the invention, a strip-like reinforcing laminate comprised of two strips $B_1$ and $B_2$ each containing plural wave or zigzag cords or filaments arranged side by side as a reinforcing element is embedded in the tread rubber 11 as a reinforcing means (i.e. the belt 12) for the crown portion of the toroidal carcass 13. In FIG. 9 is partially shown the developed view of the belt 12. Moreover, the orientation of the reinforcing element is parallel to the equator of the tire.

In the illustrated embodiment of FIG. 9, each of the strips $B_1$ and $B_2$ is comprised by covering plural reinforcing elements of cord or filament arranged side by side in wave form with a high molecular weight material having a modulus of elasticity lower than that of the reinforcing element.

The wave forms of the reinforcing elements between the strips $B_1$ and $B_2$ are shifted in phase with each other. It is important that the shifting quantity of the phase shown by $\delta$ continuously changes in the developing direction of the belt 12 as shown by $$\delta_1 < \delta_2 < \delta_3 < \delta_4 < \delta_5 > \delta_6 > \delta_7 > \delta_8 > \delta_9$$

Figure 14:
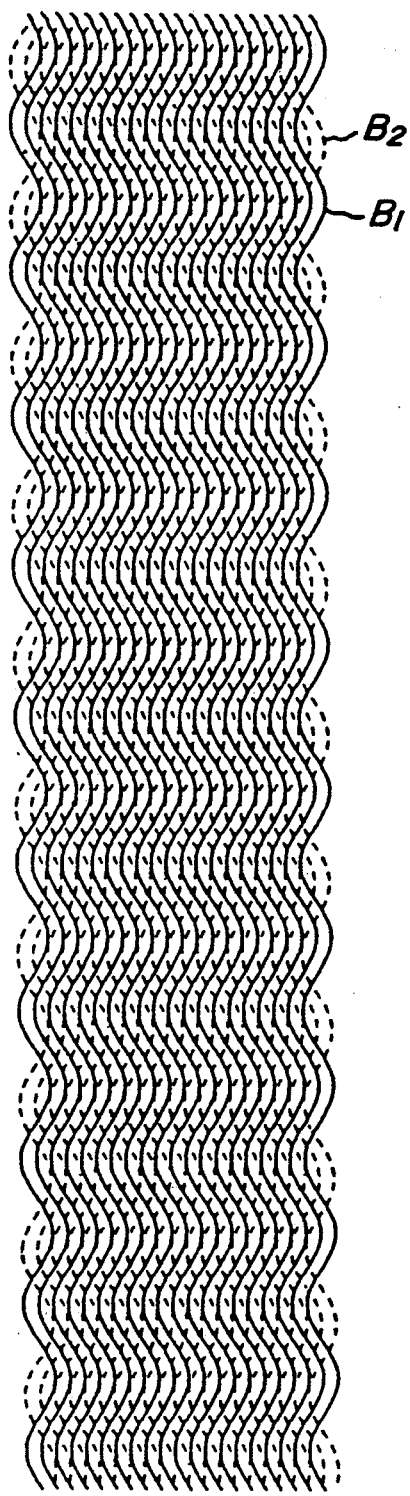
Figure 15:
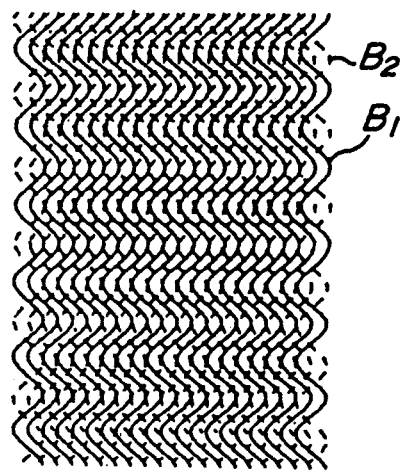

In order to prevent degradation of durability or running stability due to the expanding of tire diameter during the running of the tire under high speed rotation or heavy loading, it is required to strengthen the rigidity in circumferential direction of the belt. For this purpose, it is preferable that the shifting quantity of phases between the reinforcing elements of the adjoining strips is $\frac{1}{8} \sim \frac{3}{8}\lambda$ with respect to the wavelength $\lambda$ of the wave or zigzag. In FIGS. 14 to 16 are shown embodiments of the strip-like reinforcing laminate in which the phase shifting quantity of the reinforcing element between the strips $B_1$ and $B_2$ is within a range of $\frac{1}{8} \sim \frac{3}{8}\lambda$. In this case, the wavelength $\lambda$ of the reinforcing element constituting each of the strips $B_1$ and $B_2$ is substantially the same.

In the conventional laminate of slant crossing members, cords extending approximately straight are laid and crossed on each other in the slant crossing members, so that there is merit that they can be coped to inputs in all directions of the cord arrangement. However, these cords extending approximately straight are continuously arranged over the whole region in widthwise direction of the slant crossing member, so that the shearing strain produced between the slant crossing members of the laminate concentrates in the vicinity of free end of each cord to reduce the reinforcing effect and also degrade the durability.

On the contrary, in the strip-like reinforcing laminate according to the invention, the interlaminar shearing rigidity produced by interlaced portions 2, 2' of the cords crossed between the laid strips provides the effect of coping to input in all directions. Further, since the cord itself as the reinforcing member has a wave or zigzag form, the free ends of the approximately straight cords continuously arranged as in the slant crossing members are not existent in the strip and consequently there is caused no large interlaminar strain leading breakage or fatigue.

Moreover, the rigidity extremely lowers in the vicinity of the free end of the cord constituting the slant crossing member. In the strip-like reinforcing laminate according to the invention, uniform rigidity can be obtained over the entire region of the strip and particularly the rigidity-mitigating region can be obtained at both side edges of the strip.

In the strip-like reinforcing laminate, it is important that each of the reinforcing elements in each of the strips has interlaced portions crossly lying on at least two reinforcing elements included in another adjoining strip. For instance, when there is only one reinforcing element of the lower strip, there is a difference in the rigidity between the mutual reinforcing elements of the upper and lower strips and the reinforcing effect in the lateral direction is not produced. On the other hand, in the laminate according to the invention, the rigidity over the whole region of the reinforcing laminate is substantially uniform and the reinforcing effect in all directions can be obtained.

The reinforcing element is properly selected from organic fibers, metal wires such as steel wire or the like, cords obtained by twisting the metal wires and strand cords obtained by properly twisting the above cords in accordance with a design considering the necessary reinforcing degree. In the metal wire or cord, a plating of brass, zinc, copper or the like may be naturally carried out for improving an adhesion property to a coating of high molecular weight material, particularly rubber.

The strip-like reinforcing laminate as mentioned above stands against all directional forces in a plane of the reinforced area as in the belt reinforcing the crown portion or the chafer or flipper reinforcing the bead portion in the pneumatic tire, so that it can be utilized for the improvement of tire durability.

In order to reinforce the rigidity in circumferential direction of the belt, it is preferable that the phase difference between the adjoining strips $B_1$ and $B_2$ is $\frac{1}{8} \sim \frac{3}{8}\lambda$ when the wavelength of the reinforcing element is $\lambda$. As shown in FIG. 17, when the phase difference is zero, if tension is applied in the arranging direction of the reinforcing element, the movement of the reinforcing element is in the same direction. Hence, the shearing strain is not caused between the strips and the rigidity is lacking. On the other hand, as shown in FIG. 18, when the phase difference between the strips $B_1$ and $B_2$ is within a range of $\frac{3}{8} \sim \frac{5}{8}\lambda$, the reinforcing elements in the upper and lower strips are moved in opposite directions under tension to produce the shearing strain between the strips and consequently the restraining force to the tension is developed to strengthen the rigidity in circumferential direction of the belt. In this case, the orientation of the reinforcing element is required to be the same as in the circumferential direction of the tire.

In the comparative example shown in FIG. 10, wherein the phase shifting quantity is, for example, $\frac{1}{4}\lambda$ and is constant in the developed direction of the belt 12, there is existent such a position (l, m, n) that an angle of crossing the reinforcing elements of the strips $B'_1$ and $B'_2$ with each other is constant. As a result, each of these positions is a buckling pOint to form a buckling mode that the buckling wavelength is the same as the wavelength of the reinforcing element in the belt.

When the buckling mode is formed as mentioned above, the strips are easily buckled by compressive force in tangential direction at the belt 12 produced in the rotation under loading or the cornering. Hence, compression fatigue is caused.

On the contrary, in the strip-like reinforcing laminate according to the invention, the crossing angle is not constant because the phase shifting quantity between the reinforcements of the upper and lower strips $B_1$ and $B_2$ in the belt 12 is continuously changed as shown in FIG. 9. Thus there is periodically caused no buckling point and consequently it is avoided to cause the buckling resulting in the compression fatigue of the reinforcing element.

The following examples are given in illustration of the invention and are not intended as limitations thereof.

EXAMPLE 1

There were provided two tires for airplanes having a tire size of H46×18.0R20 and comprising a belt of five belt cord layers as shown in FIG. 4a or 4b.

In the belt of FIG. 4a, the wave-like aramid cords (Kevlar 3000 d/3, end count: 4.8 cords/cm) having an amplitude of 3 mm and a wavelength of 40 mm were used in each of the belt layers so as to change the phase of the wave-like cord among the layers every a half wavelength. In the conventional example of FIG. 4b, the straight aramid cords (Kevlar 3000 d/3, end count: 4.8 cords/cm) were arranged so as to cross cords between the adjoining layers with each other at an angle of ±20° with respect to the equator of the tire.

Each of these tires was repeatedly subjected to a takeoff simulation test according to FAA standard, wherein the tire was run from 0 MPH to 225 MPH under normal internal pressure and normal load and then the load was removed off. In the conventional tire of FIG. 4b, the tire was broken when the test was repeated 16 times. On the contrary, the tire of FIG. 4a was completely run after the test was repeated 50 times. After the completion of the above test, the tire was cut out to examine the cracking state of the belt portion, whereby results were obtained as shown in the following Table 1.

TABLE 1

|  | Example 1 | Comparative Example 1 |
| --- | --- | --- |
| Belt durability | complete running after 50 times of test repeating (no crack in the belt) | occurrence of breakage at 16 times of test repeating (occurrence of belt separation) |

EXAMPLE 2

There were provided two radial tires for truck and bus having a tire size of 11/70R22.5 and comprising a belt of a structure as shown in the following Table 2, which were then run at a speed of 65 km/h under an internal pressure of 8.0 kg/cm² and a load of 5,000 kg to measure a running distance till the occurrence of troubles.

TABLE 2

|  | Comparative Example 2 | Example 2 |
| --- | --- | --- |
| Reinforcing cord | straight cord 3 × 0.2 + 6 × 0.38 | wave-like cord 3 × 0.2 + 6 × 0.38 |
| Belt |  |  |
| $B_1$ | +65° ⎫ (inclination | amplitude: 1.9 mm |
| $B_2$ | +18° ⎬ angle of | wavelength: 17.5 mm |
| $B_3$ | −18° ⎭ slant cross- |  |
| $B_4$ | −18°   ing layers with respect to equator) | +25° ⎫ (inclination −25 ⎬ angle of  slant crossing layers with respect to equator) |
| End count (cords/cm) | 5.5 | 5.5 |
| Test result | 5195 km (belt end separation after the running) | 6349 km (belt end separation after the running) |

EXAMPLE 3

There were provided two radial tires for passenger cars having a tire size of P235/75 SR15 and comprising a belt of a structure as shown in the following Table 3, which were subjected to a high speed test to measure a maximum speed in the occurrence of troubles.

TABLE 3

|  | Comparative Example 3 | Example 3 |
| --- | --- | --- |
| Reinforcing element for belt | straight steel cord of (2 + 6) × 0.23 mm | wave-like steel wire of 0.3 mm in diameter |
| Belt |  |  |
| $B_1$ | +24° (inclination angle of cord | amplitude: 1.9 mm |
| $B_2$ | −24° with respect | wavelength: 15.5 mm |

TABLE 3-continued

| | Comparative Example 3 | Example 3 |
|---|---|---|
| | to equator) | |
| End count | 6 cords/cm | 12 wires/cm |
| Test result | 180 km/h | 194 km/h |

Further, there were provided six tires for passenger cars having a tire size of PSR 175/70 SR 13 and comprising a belt of two or three strips as shown in the following Table 4, which were then run over a distance of 50,000 km to measure residual strength of each reinforcing element (which was a wave-like steel wire of 0.5 mm in diameter) constituting the strip. Then, the retention of strength was calculated to obtain results as shown in Table 4.

TABLE 4

| | Comparative Example 4 | Comparative Example 5 | Comparative Example 6 | Example 4 | Example 5 | Example 6 |
|---|---|---|---|---|---|---|
| Strip | | | | | | |
| $B_1$ | wavy | wavy | wavy | wavy | wavy | wavy |
| $B_2$ | wavy | wavy | wavy | wavy | wavy | wavy |
| $B_3$ | — | 45° | 60° | — | 45° | 60° |
| Phase shifting quantity | ½λ constant | ½λ constant | ½λ constant | continuously change | continuously change | continuously change |
| Retention of strength | 38% | 42% | 37% | 98% | 95% | 97% |
| Developed view | FIG. 10 | FIG. 11 | FIG. 11 | FIG. 12 | FIG. 13 | FIG. 13 |

Moreover, there were provided six tires for passenger cars having a tire size of PSR 175/70 SR13 and comprising a belt of two or three strips each made from wave-like steel wire with a wavelength (λ) of 15 mm or straight cord as shown in the following Table 5, which were subjected to a high speed test under normal internal pressure and normal load to measure the expanding quantity at 150 km/h or 200 km/h.

TABLE 5

| | Comparative Example 7 | Comparative Example 8 | Example 7 | Example 8 | Example 9 | Comparative Example 9 |
|---|---|---|---|---|---|---|
| Strip | | | | | | |
| $B_1$ | wavy | wavy | wavy | wavy | wavy | +18° (inclination angle of straight cord with respect to the equator) |
| $B_2$ | wavy | wavy | wavy | wavy | wavy | −18° (inclination angle of straight cord with respect to the equator) |
| $B_3$ | | | | +45° (inclination angle of straight cord with respect to the equator) | +30° (inclination angle of straight cord with respect to the equator) | |
| Phase shifting quantity | 0 | ½λ | ½λ | ½λ | ½λ | |
| Expanding quantity at 150 km/h | 215 | 150 | 92 | 91 | 72 | 100 |
| Expanding quantity at 200 km/h | 270 | 170 | 88 | 86 | 85 | 100 |

Note
The expanding quantity is represented by an index on the basis that Comparative Example 9 is 100.

As mentioned above, the strip-like reinforcing laminates according to the invention not only produce approximately uniform resistance in widthwise direction against forces in all directions acting to the reinforced plane as a reinforcing core for the high molecular weight composite material, but also considerably mitigate the difference of rigidity apt to be caused near to the reinforced edge. They can avoid troubles such as separation, cracking and the like.

Therefore, the strip-like reinforcing laminates are effectively utilized for reinforcing various portions of pneumatic tires for various vehicles, airplanes or vehicles used under severe conditions to considerably improve the tire durability. Furthermore, the compression fatigue produced in the reinforcing elements of the belt for reinforcing the crown portion of the toroidal carcass is considerably reduced by using the above strip-like reinforcing laminate, whereby the durability and safety of the tire can be more improved.

What is claimed is:

1. A pneumatic tire comprising; a toroidal carcass extended between at least a pair of bead cores as a casing reinforcement, a belt reinforcing a crown portion of said toroidal carcass comprised of at least two belt layers each being composed of a strip comprising filaments arranged together in an undulating form in the same plane and the same direction as a reinforcing element and covered with a high molecular weight material having a modulus of elasticity lower than that of the reinforcing element, and a phase of said undulating form in said reinforcing element between said two strips is shifted so that a shifting quantity is continuously changed in the circumferential direction of said tire.

2. The pneumatic tire according to claim 1, wherein said reinforcing element is made from organic fibers.

3. The pneumatic tire according to claim 1, wherein said reinforcing element is made from steel cord or steel wire.

4. The pneumatic tire according to claim 1, wherein said high molecular weight material is rubber.

5. The pneumatic tire according to claim 1, wherein said belt further comprises a belt layer containing cords inclined at a given angle with respect to an equator of the tire.

6. The pneumatic tire according to claim 5, wherein said belt cords are organic fibers.

7. The pneumatic tire according to claim 5, wherein said belt cords are steel cords.

8. The pneumatic tire according to claim 1 wherein said undulating form is a wave form.

9. The pneumatic tire according to claim 1 wherein said undulating form is a zigzag form.

10. A pneumatic tire comprising; a toroidal carcass extended between at least a pair of bead cores as a casing reinforcement; a belt reinforcing a crown portion of said toroidal carcass comprised of a strip reinforcing laminate comprising of plural strips with each strip comprising filaments arranged together in an undulating form in the same plane as a reinforcing element and covered with a high molecular weight material having a modulus of elastitcity lower than that of the reinforcing element, each reinforcing element in each of said strips having interlaced portions on at least two reinforcing elements in the adjoining strip, and said reinforcing elements in all of said strips being aligned in the same direction and phases in said undulating form between said reinforcing element in one of said strips and said reinforcing element in another adjoining strip are shifted so that a shifting quantity is $\frac{1}{8}-\frac{3}{8}\lambda$ where $\lambda$ is a wavelength of said reinforcing element.

11. The pneumatic tire according to claim 10, wherein said reinforcing element comprises organic fibers.

12. The pneumatic tire according to claim 10, wherein said reinforcing element comprises steel wire.

13. The pneumatic tire according to claim 10, wherein said high molecular weight material is rubber.

14. The pneumatic tire according to claim 10, wherein said reinforcing element comprises steel cord.

15. The pneumatic tire according to claim 10, wherein said undulating form is a wave form.

16. The pneumatic tire according to claim 10, wherein said undulating form is a zigzag form.

17. A pneumatic tire comprising: a toroidal carcass extended between at least a pair of bead cores as a casing reinforcement; a belt reinforcing a crown portion of said toroidal carcass comprised of a strip reinforcing laminate comprised of plural strips with each strip comprising filaments arranged together in an undulating form in the same plane as a reinforcing element and covered with a high molecular weight material having a modulus of elasticity lower than that of the reinforcing element, each reinforcing element in each of said strips having interlaced portions on at least two reinforcing elements in the adjoining strips, and said reinforcing elements in all of said strips being aligned in the same direction, and at least one of amplitude and wavelength of said undulating reinforcing element in each strip of the above said strip lamination structure is different between the adjoining mutual strips.

18. The pneumatic tire according to claim 17, wherein said reinforcing element comprises organic fibers.

19. The pneumatic tire according to claim 17, wherein said reinforcing element comprises steel wire.

20. The pneumatic tire according to claim 17, wherein said reinforcing element comprises steel cord.

21. The pneumatic tire according to claim 17, wherein said high molecular weight material is rubber.

22. The pneumatic tire according to claim 17, wherein said undulating form is a wave form.

23. The pneumatic tire according to claim 17, wherein said undulating form is a zigzag form.

24. A pneumatic tire comprising; a toroidal carcass extended as a casing reinforcement between a pair of bead cores located in bead portions of the tire, a strip reinforcing laminate comprised of plural strips with each strip comprising filaments arranged together in an undulating form in the same plane as a reinforcing element and covered with a high molecular weight material having a modulus of elasticity lower than that of the reinforcing element, each reinforcing element in each of said strips having interlaced portions on at least two reinforcing elements in the adjoining strip, and said reinforcing elements in all of said strips being aligned in the same direction, and used as a reinforcing means for said bead portion.

25. The pneumatic tire according to claim 24, wherein said strip reinforcing laminate is arranged so as to surround each of said bead cores.

26. The pneumatic tire according to claim 24, wherein said undulating form is a wave form.

27. The pneumatic tire according to claim 24, wherein said undulating form is a zigzag form.

* * * * *